United States Patent [19]

Rowley

[11] 4,316,870
[45] Feb. 23, 1982

[54] PLASTIC TUBE, COUPLING, AND METHOD OF FORMING SAME

[76] Inventor: William W. Rowley, 12117 Bradford, Chardon, Ohio 44024

[21] Appl. No.: 157,395

[22] Filed: Jun. 9, 1980

Related U.S. Application Data

[62] Division of Ser. No. 912,743, Jun. 5, 1978, abandoned.

[51] Int. Cl.³ .......................................... B29C 24/00
[52] U.S. Cl. ..................................... 264/296; 264/322; 425/393
[58] Field of Search ...................... 264/296, 320, 322; 425/393

[56] References Cited

U.S. PATENT DOCUMENTS

| | | | |
|---|---|---|---|
| 3,509,252 | 4/1970 | Baehr | 264/296 |
| 3,843,300 | 10/1974 | McFarlane | 264/322 X |
| 3,929,943 | 12/1975 | Klimaszewski | 264/322 X |
| 4,140,739 | 2/1979 | Cotten | 264/138 |

FOREIGN PATENT DOCUMENTS 877735 9/1961 United Kingdom.

Primary Examiner—Thomas P. Pavelko
Attorney, Agent, or Firm—Maky, Renner, Otto & Boisselle

[57] ABSTRACT

Plastic tubing of extruded polybutylene is provided with an integrally formed end cap or bulb to facilitate the joining of the tube to fixtures, unions, couplings or the like. The end cap or bulb is formed from the tube wall to form a structural bulb and sealing surface which includes a stop flange providing a shoulder permitting the tube and the sealing surface to be drawn into sealing engagement with a mating part. The structural bulb and sealing surface is formed from the wall of the tube in a special two part jig which includes male and female dies. The tube is inserted through the female die to extend a predetermined distance therefrom and the projecting portion of the tube is heated. While the tube is held against axial movement, the dies are brought together to form the structural bulb and sealing surface from the tube wall.

12 Claims, 8 Drawing Figures

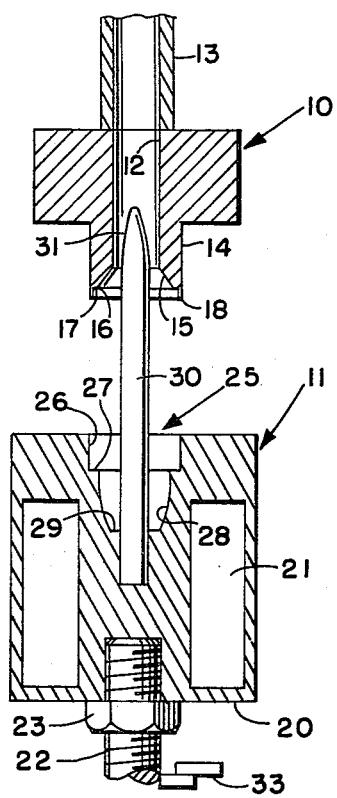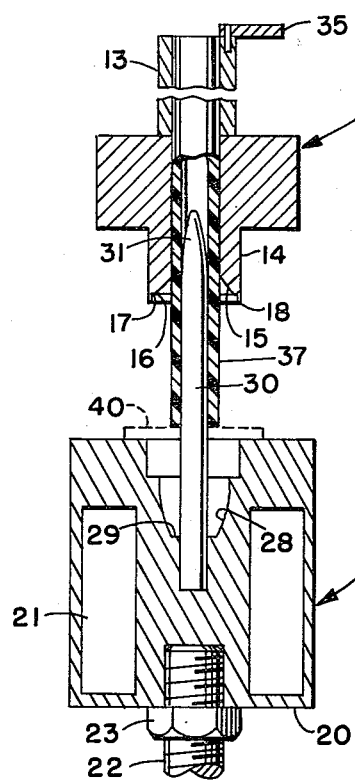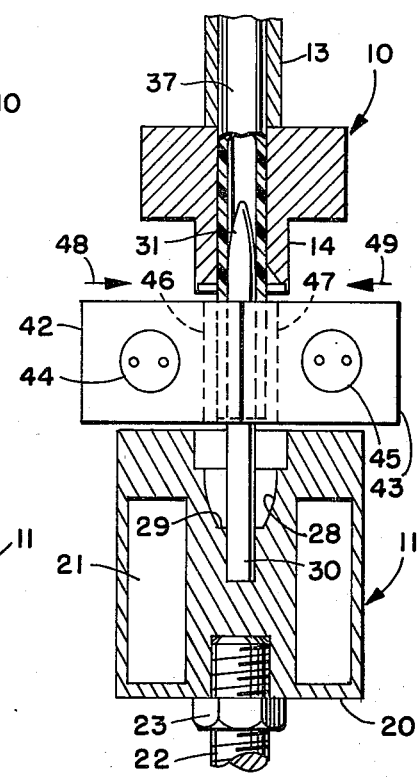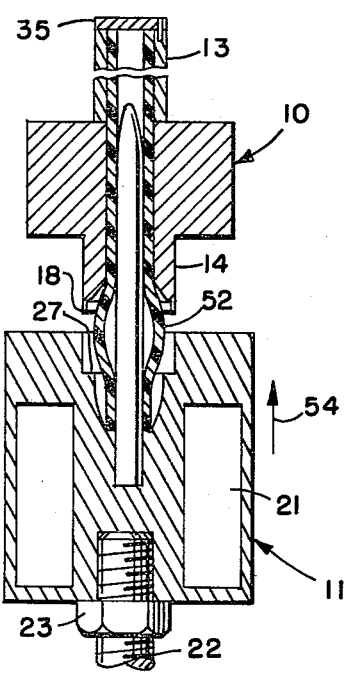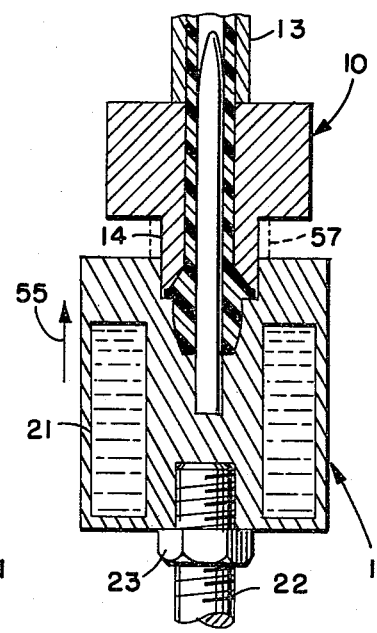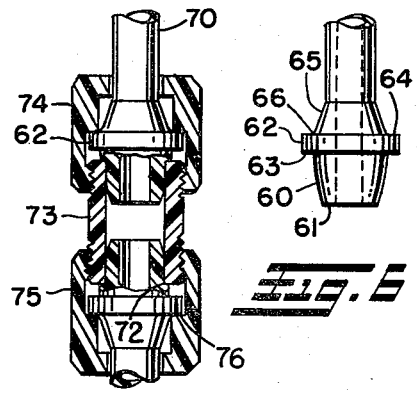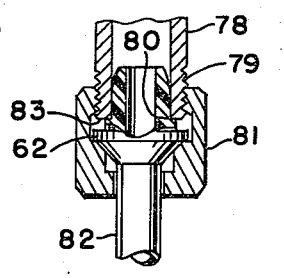

PLASTIC TUBE, COUPLING, AND METHOD OF FORMING SAME

This is a division of application Ser. No. 912,743, filed June 5, 1978, now abandoned.

This invention relates generally as indicated to a plastic tube, a coupling, and a method of forming the same. More particularly, the present invention relates to plastic tubing having utility in plumbing installations.

BACKGROUND OF THE INVENTION

In plumbing installations, copper tubing is widely employed. In risers, used for connecting tubing to fixtures or tanks, the end of the copper tubing is shaped to form a bulb sealing surface and such bulb includes a shoulder permitting the tubing and thus the bulb sealing surface to be drawn into biting or sealing engagement with the fixture. The cost of such copper tubing and the cost of forming the same to permit the connection to such fixtures or tanks is substantial.

More recently, polybutylene has been approved for use in plumbing. Polybutylene is a relatively new polyolefin. Tubing or pipe made of polybutylene is normally joined by heat-fusion techniques, by mechanical compression, and by cold-flaring. Reference may be had to the Modern Plastics Encyclopedia, 1976–1977, page 49, for a discussion of polybutylene, its chemistry, properties, and grades.

In order to provide such polybutylene tubing with a bulb sealing surface or an end cap for such purposes, a variety of techniques have been employed. A common technique is to employ a separately molded bulb which is spun-welded to the O.D. of the end of a tube. Another technique is to form a flange on the O.D. of the tube and again to insert a separately molded neoprene or like concave washer on the flange for sealing purposes. Both such processes have cost and performance drawbacks. Both require separately molded parts which must be joined to the tubing in assembly operations. Moreover, a two-part tubing end cap or bulb sealing construction does not have the performance integrity or the expected useful life of the tubing itself. In a spun welding technique excessive clamping pressures may cause the loaded part to become dislodged or separated from the O.D. of the tubing and the interface of the parts provides a possibility of leakage. In the case of a neoprene or like washer employed on the O.D. of the tubing, the same interface leakage susceptibility is present. Moreover, a flange formed to receive the washer may itself create a point of weakness if excessive clamping pressures are employed. Further, neoprene washers are known to deteriorate with age and temperature exposure.

SUMMARY OF THE INVENTION

It is accordingly a principal object of the present invention to provide plastic tubing which includes on the end thereof an integrally formed bulb and sealing surface.

It is another principal object to provide a plastic tube for plumbing use where the bulb and sealing surface on the end thereof is not formed of a multiplicity of parts.

A further important object is the provision of a simplified method for forming an end cap or bulb sealing surface on the end of a plastic tube having the strength and durability of the tube itself.

Another object is the provision of a plastic tube, preferably polybutylene which includes an integrally formed end cap or bulb sealing surface which terminates in a radial shoulder or sealing flange so that the tube and thus the sealing surface may be drawn into sealing engagement with a fixture and the like.

Another important object is the provision of a method for forming the end cap or bulb sealing surface from the wall of the tube itself, such method comprising the steps of inserting the tube on a male die closely conforming to the I.D. of a tube with the tube extending through a female die and projecting therefrom a predetermined distance. The projecting portion of the tube is heated only sufficiently to permit the tube to fold and conform to a recess in both dies as the dies are brought together.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF DRAWINGS

In said annexed drawings:

FIG. 1 is a fragmentary vertical section of the dies employed to form the tubing in accordance with the present invention, such dies being shown intermediately separated;

FIG. 2 is a view similar to FIG. 1 showing the tubing inserted through the female die, partially inserted on the male die and projecting a predetermined distance from the former;

FIG. 3 is a view similar to FIGS. 1 and 2 showing the tube projecting portion being heated;

FIG. 4 is a view similar to FIGS. 1–3 showing the dies being brought together;

FIG. 5 is a view similar to FIG. 4 showing the dies closed;

FIG. 6 is a fragmentary elevation of the end of the tube as formed by the process depicted in FIGS. 1–5;

FIG. 7 is a broken section illustrating a plastic tube coupling utilizing the present invention; and FIG. 8 is a similar section illustrating the tube of the present invention joined to a fixture and the like.

DESCRIPTION OF THE PREFERRED EMBODIMENTS

Referring first to FIGS. 1–5, there is illustrated the tubing for forming previously cut lengths of plastic tubing to form integrally on end thereof a structural bulb and sealing surface.

As seen in such figures, the tubing comprises a top vertically fixed mold 10 and a vertically movable bottom mold 11. The top mold or die 10 includes a central bore 12 and a riser tube 13 secured to the top thereof having an I.D. the same as the I.D. of the bore 12. The lower surface of the top mold is provided with a cylindrical projection 14 projecting centrally therefrom. The lower end of the bore is provided with a conical flaring portion 15, the lower end of which is provided with a small radius seen at 16. Radially beyond such radius, the bore is provided with an axially facing shoulder 17 which terminates in an axially extending relatively thin edge 18.

The bottom mold 11 includes a body 20 which may include an annular passage 21 for the circulation of a cooling medium therethrough. The body 20 is threadedly connected to rod 22 of a piston-cylinder assembly and adjustably locked thereto by the nut 23. The top of the mold or mold or die 11 is provided with a central recess shown generally at 25 which includes an upper cylindrical portion 26 into which the axial projection 14 of the top mold is designed closely to telescope. The lower end of the cylindrical portion is provided with a shoulder 27 separating the cylindrical portion of the recess from bulb forming portion 28. The lower end of the bulb forming recess is provided with a horizontal circular axially facing end face 29 which is preferably selectively larger in diameter than the diameter of the bore 12. Projecting axially from the bottom of the recess 25 is a guide rod 30, the top of which is provided with a pilot nose or pointed portion 31.

In FIG. 1 the top and bottom molds or dies have been brought to an intermediate position relative to each other in that the bottom mold 11 has been brought to an intermediate elevated position and the position may be determined by a retractable adjustable stop as seen at 33 in FIG. 1. In such position the pilot nose of the guide rod 30 projects into the bore 12 as shown.

Referring now to FIG. 2 it will be seen that the top of the guide tube 13 is provided with a back stop seen at 35 which may be pivoted to the top of the guide tube 13 for swinging movement to and from a position clear of the I.D. of such tube or over the I.D. of such tube.

An extruded plastic, preferably polybutylene, tube section, cut to a predetermined length, is now inserted downwardly through the guide tube as seen at 37 to project from the lower end of the top mold 10. The dimensions of the tube both O.D. and I.D. are such that the tube will fit snugly in the I.D. of the bore 12 with the I.D. of the tube fitting snugly over the O.D. of the rod 30. It is important that the tube 37 project a predetermined distance below the top mold 10. This predetermined distance can be obtained in several ways. When the operator inserts the tube the operator can insure that the top of the tube is flush with the top of the guide tube 13 and pivoting the back stop 35 over the top of the tube gages the tube against such back stop. In this manner the tube length may be gaged from the top end to project the predetermined distance noted. Alternatively, a gage bar shown at 40 may be employed to contact the lower end of the tube to obtain the desired projection.

With the molds still in their intermediate position and the tube properly positioned and projecting from the top mold, the projecting end of the tube is now heated as seen in FIG. 3. The heating of the tube may be accomplished in a variety of ways. In FIG. 3, two heating blocks 42 and 43 are employed each provided with electrical heating elements seen at 44 and 45, respectively. Such heating blocks may be provided with semi-circular vertical recesses indicated at 46 and 47, respectively, to confine the projecting end of the tube 37 therebetween. Such blocks may be mounted for movement horizontally as indicated by the arrows 48 and 49, respectively, to and from a mating position confining the projecting end of the tube therebetween.

The projecting end of the tube is heated for a predetermined period so that the projecting end of the tube is heated short of a complete melt but sufficiently to make the material pliable enough to fold form and mold when the dies are brought together.

It will of course be appreciated that other forms of application of heat may be employed such as sonics or a heating jacket employing oil or other heating medium.

After the desired amount of heat is applied, the heating blocks are removed. If a bottom gage is employed the gage 40 is also removed and the retractable stop 33 is withdrawn. With the back stop 35 in place, the piston-cylinder assembly of the rod 22 is now further extended as seen in FIG. 4 and the projecting end of the tube seats in the bottom face 29 of the bulb forming cavity 28 and begins to fold or form as seen at 52. As the bottom mold 11 moves upwardly as indicated by the arrows 54 and 55 in FIGS. 4 and 5, respectively, the axial projection 14 of the top mold telescopes within the cylindrical recess 26 of the bottom mold. The bottom mold continues upwardly to the position shown in FIG. 5 forming the tube end as indicated. During such movement, the back stop 35 keeps the tube from moving upwardly with respect to the top mold. The piston-cylinder assembly is fully extended until the edge 18 of the top mold engages the shoulder 27. Such edge will tend to bite off or render easily removable any flash formed between the telescoping surfaces of the molds. Alternatively, a stop or gage ring can be provided as seen at 57 to limit the relative movement of the molds and to avoid wear on the edge 18. When the molds are fully together as seen in FIG. 5 a cooling medium may be circulated through the passage 21 as seen at 58. While water is preferred, it will be appreciated that the cooling medium could be many other fluids such as oil or a gas.

After the mold has been cooled for a predetermined time, the piston-cylinder assembly of the rod 22 is fully retracted and the top mold may be indexed horizontally so that the now formed tube may be removed. If any flash appears, it can readily be removed from the tube.

After the formed tube is removed, the top mold may be indexed horizontally again to be in alignment with the bottom mold and the stop 33 is returned to its position and the piston-cylinder assembly is extended to bring the molds back to the original FIG. 1 position so that the process may be repeated.

It will be appreciated that the tooling illustrated may be either horizontally or vertically oriented and that the recess configurations therein may readily be altered to form a bulb sealing end of varying configurations. For example, it is noted that the bulb recess 28 provides a radiused profile but this could be conical. Also, the tube holder 13 can readily be changed to accommodate tubes precut to different lengths. In practicing the process, it is important however that the projecting heated end of the tube substantially conform to the volume of the mating recesses in the two dies or molds. Whether employed horizontally or vertically, the relatively fixed mold 10 may be termed the female mold while the movable mold 11 with the guide rod projecting therefrom projecting and holding the I.D. of the tube may be termed the male mold or die.

The resultant product is seen in FIG. 6. The plastic tube thus formed includes an integrally formed end cap which includes a flared sealing surface 60 extending from the end face 61 of the tube to radially extending flange 62. The sealing surface 60 may be radiused as indicated or it may be conical. The end face 61 of the tube has a slightly larger O.D. than the remainder of the tube so that the wall of the tube at the sealing surface is substantially enlarged throughout its length. The sealing surface terminates in the flange 62 which includes a stop face 63 adjacent the sealing surface and a shoulder 64 on the opposite side. From the shoulder to the O.D. of the tube there is provided a fillet 65 which joins the flange spaced from the peripheral edge thereof with a slight radius 66.

In FIG. 7 there are illustrated two such formed tubes joined with a plastic coupling. Such coupling comprises two facing polybutylene tubes 70 and 71, the ends of which have been formed in accordance with the present invention which are drawn into biting and sealing engagement with the sharp inside corners 72 of nipple 73 which is externally threaded on each end to receive nuts 74 and 75. Such nuts include internal shoulders 76 which engage behind the shoulders 64 of the tubes to draw the tubes toward each other and into such engagement with the sharp I.D. internal edges of the nipple. Such engagement causes the bulb sealing surface 60 of each tube to deform providing a seal at the deformed portion and the inside corner of the nipple. Overtightening of the nuts will simply bring the end face of the nipple into abutment with the stop face 63 of the respective flanges of the formed tubes. It is noted that the components of the coupling such as the nuts and nipple are not polybutylene, since, to applicant's knowledge, there are no suitable injection molding grades of polybutylene. Other relatively hard plastics such as Nylon or vinyls may be employed.

In FIG. 8 there is shown a tube formed in accordance with the present invention utilized as a riser for a tank or other fixture, the fixture including a pipe or tube 78 of metallic construction externally threaded as indicated at 79. The inside corner of the pipe of tube 78 is provided with a sharp biting edge seen at 80 and a nut 81 may be employed to draw the tube 82 into sealing engagement as shown. The nut 81 may also be metallic and is of the same configuration as the nuts 74 and 75. Again overtightening of the nut will simply draw the flange into butting engagement with the end face of the pipe or tube 78.

As previously indicated, polybutylene is the preferred material. Although other polyolefin resins may be formed in the same manner, the polybutylene is preferred because of its approval for plumbing installations.

In any event, by the fold forming process of the present invention an integral bulb sealing end cap can be formed on the tubing providing not only cost advantages but also service and structural advantages.

Other modes of applying the principle of the invention may be employed, change being made as regards the details described, provided the features stated in any of the following claims or the equivalent of such be employed.

The embodiments of the invention in which an exclusive property or privilege is claimed are defined as follows:

1. A method of integrally forming an end cap having a sealing surface on a plastic tube comprising the steps of placing the end of the tube to be formed partially on an elongated male die projection of a male die with the projection closely conforming to the I.D. of the tube, such male die including a cup-shape recess from which the male die projection projects axially and concentrically, surrounding the O.D. of the tube with a female die which also includes a recess adapted to cooperate with the recess of such male die, holding such dies separated with the tube end to be formed projecting from the female die and placed at least partially on said male die projection, then heating the portion of the tube projecting from the female die sufficiently to make such projecting portion pliable enough to form, and then by moving the dies together, forming the heated portion of the tube into the configuration of the cooperating recesses.

2. A method as set forth in claim 1 including the step of gaging the projecting portion of the tube so that the volume of plastic in such projecting portion substantially corresponds to the volume of the recesses when the dies are together.

3. A method as set forth in claim 1 including the step of holding the tube against axial movement as the dies are brought together.

4. A method as set forth in claim 1 including the step of cooling at least one of the dies after they are brought together.

5. A method as set forth in claim 1 wherein said step of holding such dies separated includes holding the dies separated such that the male die projection extends partially into the female die during heating of the tube and completely through the heated portion of the tube.

6. A method of integrally forming an end cap on a plastic tube between mating male and female dies, comprising the steps of inserting the tube into a female die with the end to be formed projecting axially therefrom and the remainder supported in the female die along its length, inserting a projection on the male die into such projecting end of the tube to protect the I.D. thereof, and then heating the projecting end of such tube, and then moving the dies together to form the heated projecting end of the tube between the male and female dies with the end of the tube opposite the projecting end engaging a backstop to keep the tube from moving with respect to the female die.

7. A method of forming an end cap on a plastic tube between male and female dies having mating recesses in the facing surfaces thereof, the male die having a projection closely conforming to the I.D. of the tube and projecting axially and concentrically from the recess in the male die, comprising the steps of placing the end of the tube to be formed partially on the male die projection, surrounding the O.D. of the tube with a female die, holding the dies separated with the tube projecting from the female die and onto the male die projection, then positioning a heating device between the dies to surround and heat the projecting portion of the tube, then retracting the heating device out of the way of the dies after the projecting portion of the tube has been heated sufficiently to make the projecting portion pliable enough to form, and then forming the heated portion of the tube by moving the dies into mating engagement.

8. A method as set forth in claim 7 further comprising the step of closely telescoping an axial projection on the female die partially into the recess in the male die, such axial projection including the female die recess that cooperates with the recess in the male die to define the configuration of the end cap.

9. A method of integrally forming a bulb sealing surfce on the end of a length of plastic tubing between male and female dies having mating recesses in the facing surfaces thereof, the male die further having a projection closely conforming to the I.D. of the tubing and projecting axially and concentrically from the recess in the male die, comprising the steps of inserting the end of the tubing to be formed through the female die to project axially therefrom, inserting the male die projection into such tubing end to protect the I.D. thereof, then heating the projecting portion of such tubing sufficiently to make such projecting portion pliable enough to form, and then, by moving the dies together, forming the bulb sealing surface from the wall of the tubing.

10. A method as set forth in claim 9 including the step of gaging the projecting portion of the tube so that the volume of plastic in such projecting portion substantially corresponds to the volume of the recesses when the dies are together.

11. A method as set forth in claim 9 including the step of holding the tube against axial movement as the dies are brought together.

12. A method as set forth in claim 9 including the step of cooling at least one of the dies after they are brought together.

* * * * *